Figure 3:
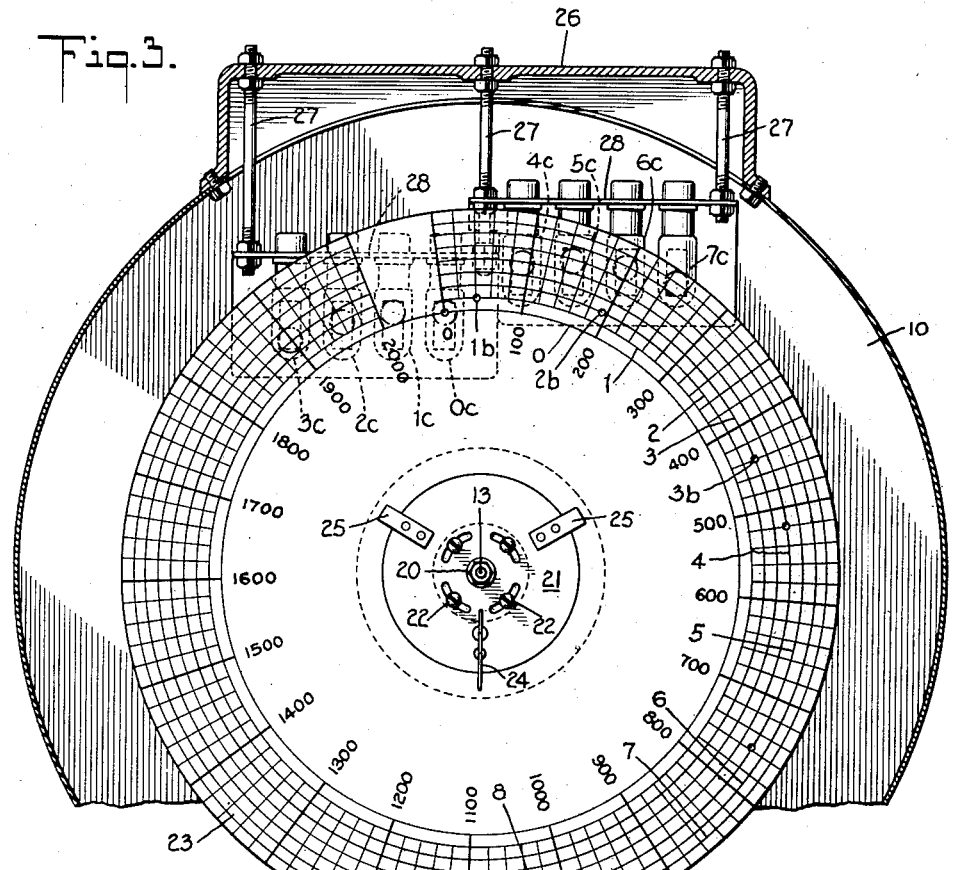

Sept. 1, 1953  O. S. CARLISS  2,650,790
PHOTOELECTRIC BATCHING WEIGHER
Filed Jan. 13, 1949  2 Sheets-Sheet 1
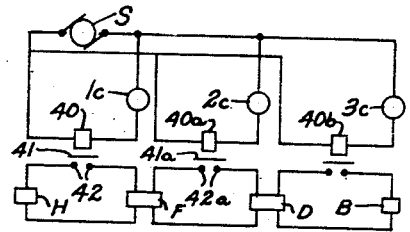
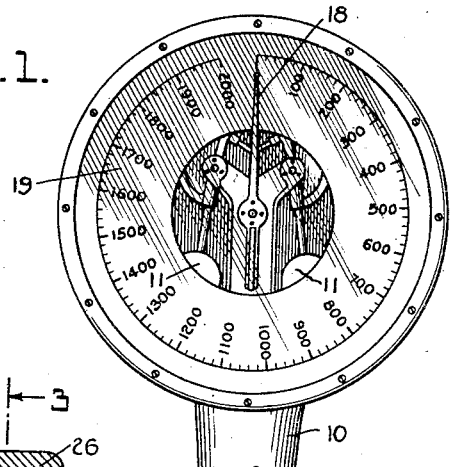
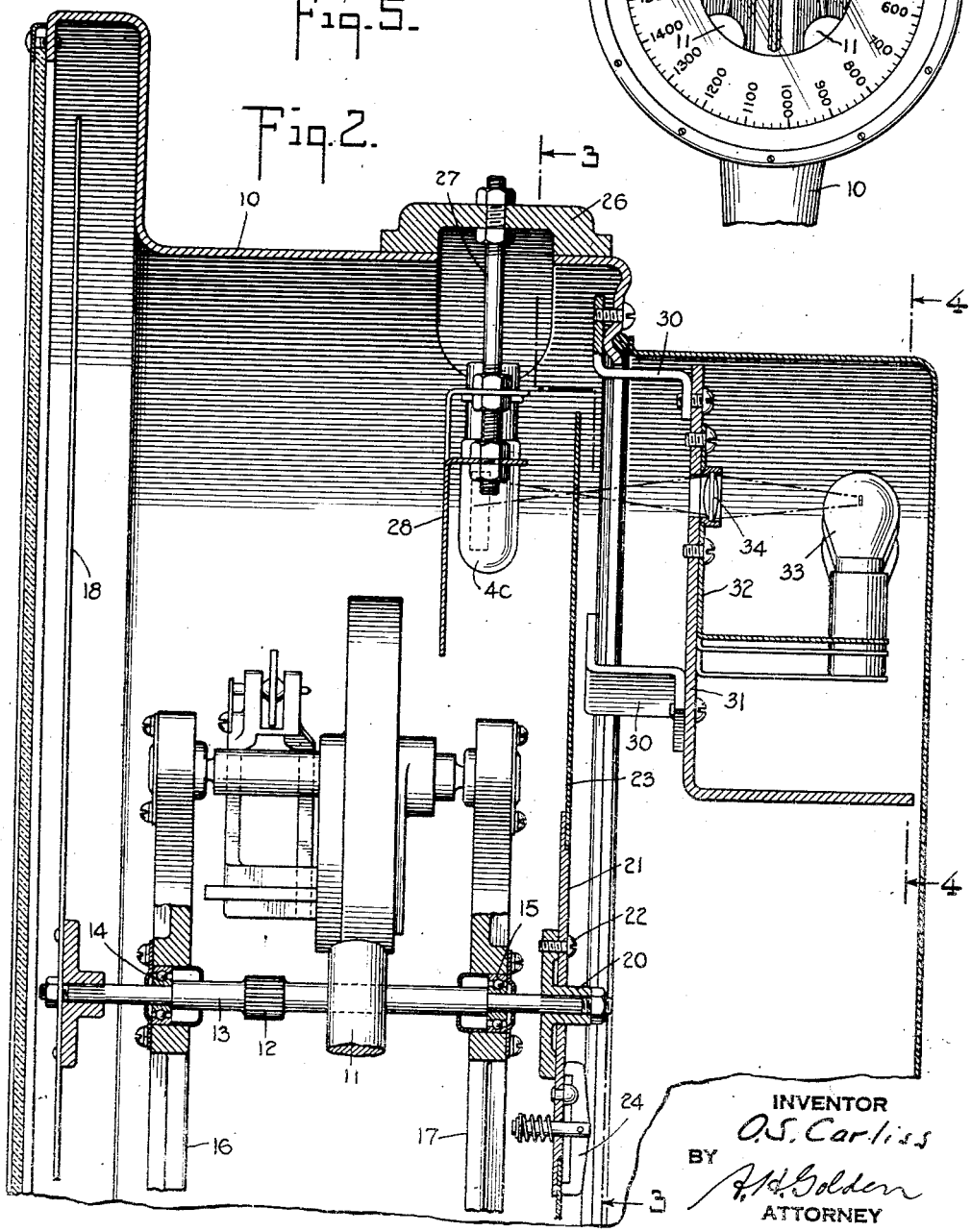
INVENTOR
O. S. Carliss
BY
A. H. Golden
ATTORNEY Sept. 1, 1953 O. S. CARLISS 2,650,790
PHOTOELECTRIC BATCHING WEIGHER
Filed Jan. 13, 1949 2 Sheets-Sheet 2

INVENTOR
O. S. Carliss
BY
A. H. Golden
ATTORNEY

Patented Sept. 1, 1953

2,650,790

UNITED STATES PATENT OFFICE 2,650,790

PHOTOELECTRIC BATCHING WEIGHER

Oswald S. Carliss, Glenside, Pa., assignor, by mesne assignments, to The Jacobs Bros. Co. Inc., New York, N. Y., a corporation of New York Application January 13, 1949, Serial No. 70,659

4 Claims. (Cl. 249—14)

This invention relates to a batching scale of that class in which a series of commodities are weighed for consecutive feeding to mixing or processing machinery or the like. Scales of the particular class are equipped with weight responsive means that may be preset whereby at predetermined weights to actuate certain controls. It is the object of my invention to contribute a scale of the particular class adapted to operate in a very effective and simple manner, and arranged for ready adjustment and conversion for predetermining various batches of different materials. It is the further object of my invention to contribute a novel type of control dial or disc for use on a scale of the particular class.

As a feature of my invention, I utilize an element adapted for movement in response to different weights, this element carrying a dial or disc equipped with control perforations. By passing light through these control perforations toward light sensitive means, it is possible to actuate any usual type of batching apparatus.

As a particular feature of my invention, the control perforations are formed in a dial or disc at different radial distances from the axis of rotation of the dial or disc, the circumferential path for each radial distance being thus effective to control the weighing of a particular commodity. By arranging for the passage of light through the disc at points spaced different radial distances from the axis of rotation of the dial, as well as at different weight intervals as the dial or disc rotates in response to weights, a dual control is obtained. As a more particular feature of this part of the invention, I prefer to utilize a series of light sources and a series of light sensitive elements arranged at said different radial distances from the axis of rotation. However, it is possible to utilize a single light sensitive element with means arranged to pass the light to the said single light sensitive element as by mirrors or transparent rods as light passes through the several control perforations.

As a further feature of my invention, by simply changing the dial or disc, and forming perforations therein at different weight intervals, light may be passed through the control perforations upon rotation of the weight responsive element through different weight intervals so as to vary the batching control.

I have thus outlined rather broadly the more important features of my invention in order that the detailed description thereof that follows may be better understood, and in order that my contribution to the art may be better appreciated.

There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention.

Figure 4:
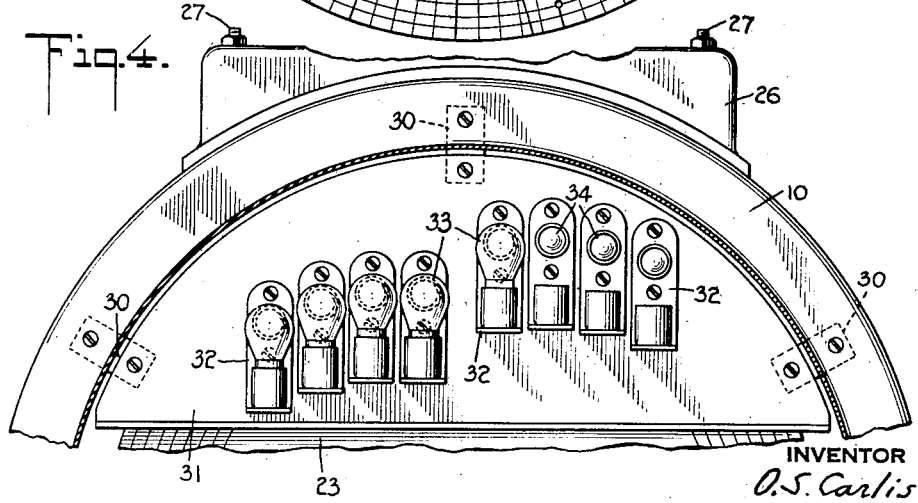

Referring now to the drawings, Fig. 1 is an elevation of the head of a pendulum scale of the general class well known in the art, the particular figure showing the front of the scale with the indicating hand rotating relatively to a dial chart. Fig. 2 is an enlarged vertical section through the mechanism of Fig. 1. Figs. 3 and 4 are sections taken along lines 3—3 and 4—4 of Fig. 2. Fig. 5 is a schematic electric wiring diagram.

Referring now more particularly to the drawings, and especially Figs. 1 and 2, reference numeral 10 indicates the main frame of a usual pendulum scale equipped with a pair of rotating pendulums 11 moving in response to a weight applied to the scale as is particularly well set forth in the application of Charles S. Schroeder, Ser. No. 574,082 filed January 23, 1945, now Patent No. 2,618,476. As is described in the said application, the rotating pendulums act through a rack to rotate a pinion 12 on a shaft 13 suitably mounted in bearings 14 and 15 carried respectively by structural members 16 and 17 forming part of the frame of the scale. Shaft 13 has secured at its forward end a pointer 18 that rotates relatively to a dial chart 19. Obviously, the pointer 18 will rotate in response to the load that is applied to the weight responsive pendulums 11.

At its rear end, the shaft 13 has fixed thereto a flanged hub 20. This flanged hub 20 is adapted to carry a disc 21 secured adjustably thereto by a series of screws 22. A second disc 23, to which I shall refer hereinafter as a dial, is secured to the first disc 21 by means of a spring pressed securing finger 24, best shown in Fig. 2, but also well illustrated in Fig. 3. Also adapted to hold in place the dial 23 is a pair of brackets 25 carried by the disc 21. Actually, for the purposes of the present invention, the disc 21 and the dial 23 may be integral, it being necessary merely to know that the said dial is mounted to rotate with the pointer 18 on a predetermined axis in response to the weights applied to the scale.

Dial 23 is preferably prepared with a series of circumferential lines at different radial distances from the predetermined axis of rotation of the dial, this axis being the axis of shaft 13. The dial is further prepared with a series of radial lines corresponding to the weight indications on the dial chart 19 at the front of the scale. For purposes of construction, dial 23 is secured with its zero weight line offset relatively to the zero weight line of dial chart 19. This is of no particular importance, however, since the rotation of both the pointer 18 and the disc 23 will be directly proportional to the weights applied to the scale.

The first circumferential line is called by me the 0 line, and in preparing the dial 23, I form a perforation at that point in the 0 line coinciding with the radial line corresponding to zero weight. The second circumferential line is designated the No. 1 line, and this line will have a perforation formed therein at that point denoting the weight of the first material to be weighed as part of a batch. In the dial 23 this particular perforation is designated as 1b. The third circumferential line is designated by reference numeral 2. On this line there will be formed a perforation 2b at the particular weight designation spaced from weight designation 1b that corresponds to the weight of the second material forming a component of the batch. There will be a fourth line 3 in which is formed a perforation 3b spaced from perforation 2b in correspondence with the weight of the third material to be supplied to the batch. Of course, there are the further circumferential lines 4, 5, 6 and 7, all to have perforations spaced in accordance with the 4th, 5th, 6th, and 7th materials to be added to a batch. From the description so far presented, it will be apparent that means must be provided for passing light through the particular perforations for the general purpose described.

Mounted on the rear of the scale head as best seen in Figs. 2 and 3 is a casting 26, three rods 27 extending downwardly from the said casting into the scale head. Horizontally offset plates 28 are carried by the said rods 27, with adjacent ends of these plates attached to one of the rods 27 and the opposed end of each plate attached to one of the other two rods 27. Suitably mounted on the plates 28 are light sensitive elements designated 0c, 1c, 2c, 3c, 4c, 5c, 6c, and 7c. The light sensitive parts of the light sensitive elements are particularly positioned therein so as to be in radial alignment with the circumferential lines 0-7 of the dial 23. Thus, the light sensitive part of light sensitive element 0c is adapted for alignment with the perforation of the 0 line, while the light sensitive part of light sensitive element 1c is radially placed for alignment with perforation 1b of the No. 1 line. The particular alignment of the remaining light sensitive elements will be apparent from a simple examination of Fig. 3.

As best illustrated in Figs. 2 and 4, three brackets 30 are secured to the head of the scale, these brackets carrying a disc 31 that in turn supports a series of lamp carrying brackets 32. Each lamp carrying bracket 32 has a socket for an incandescent lamp 33, there being eight such lamps, with the brackets 32 placed so that one lamp is in alignment with one of the light sensitive parts of the several light sensitive elements 0c-7c. In addition, each lamp carrying bracket 32 supports through suitable means a lens 34, the several lenses 34 acting to focus the light from the several lamps 33 on the several light sensitive cells.

Of course, as may readily be determined from Fig. 2, the dial 23 prevents the passage of light from the lamps 33 to the light sensitive elements 0c-7c, except through the several perforations. Moreover, only when a perforation in particular radial alignment with the axis of shaft 13 is positioned between a particular lamp 33 and a particular light sensitive element, can light pass from the lamp to the particular light sensitive element. Thus, perforation 2b will control the passage of light from one lamp 33 to light sensitive element 2c. In other words, when perforation 2b is between light sensitive element 2c and a particular lamp aligned relative to element 2c, then light will pass as shown in Fig. 2 through the perforation 2b to fall on the light sensitive part of element 2c. The alignment of any other perforation angularly relatively to the light sensitive element 2c will in no way affect the said element because of the particular relationship between the element and the lamp and lens 34 opposite it.

In Fig. 5 I show schematically a series of simple electric circuits that may be used for the light sensitive elements of my invention. Upon the application of light to the light sensitive element 1c, the current flowing from source S through relay 40 will be varied so that the armature 41 of the relay will close a circuit between contacts 42. This will actuate the hopper H for stopping the flow of a particular material. At the same time, a second hopper F will be actuated for beginning the feed of the next material to be utilized for the batch. Further, the application of light to the light sensitive element 2c will vary the current flowing through relay 40a so that the armature 41a will close a circuit between contacts 42a. This actuates hopper F to stop the flow of material from this hopper, and simultaneously begins the feed of material from the hopper D. Light sensitive element 3c acts in a similar way through relay 40b to actuate hoppers D and B.

Let us say now that it is desired to make a batch of serveral materials and that for the purpose a particular dial 23 is to be prepared. A perforation will be formed in the 0 line for alignment with light sensitive element 0c. The purpose of using a perforation here is to insure that a previous batch of materials mixed on the scale has been entirely consumed. Thus, if any material is left in the container on the scale, the 0 perforation will not align with the controlling light sensitive element 0c. Let us say that it is now desired to utilize 20 lbs. of the first material to be added to the batch. Perforation 1b will be formed in line 1 where it meets the radial line corresponding to 20 lbs. Let us now say that the next material to be added to the batch must weigh 175 lbs. By making a perforation 2b at that radial weight line representing 175 lbs. from the first weight of 20 lbs. on the dial, we insure adding to the batch material weighing 175 lbs., this being the weight differential represented by the space between perforations 1b and 2b. Let us say that the weight of the next material to be added to the batch shall be 225 lbs. We then place a perforation in line 3 at the radial line representing 225 lbs., from the pound indication of perforation 1b in the particular scale arrangement. The weight differential between perforation 3b and perforation 2b is thus 225 lbs. It is though not necessary to lengthen this specification by explaining the remaining perforations in the remaining circumferential lines.

The dial 23 is now applied on the scale with the 0 perforation in alignment with light sensitive element 0c and the particular one of the lamps 33 and its corresponding lens 34. Light will shine through the 0 perforation onto the light sensitive element whereby to start the flow of a material through a hopper. As the material flows, the dial 23 will rotate with the pointer 18 until perforation 1b moves opposite light sensitive element 1c. As earlier indicated, light will now shine on the light sensitive element 1c through the perforation 1b, changing the rate of the flow of electricity through the relay 40 from the source S. This will effect movement of armature 41 of relay 40 to close a circuit between the points 42. The closing of the circuit at 42 will immediately close the hopper H so as to stop at once the feeding of the material that has just been weighed. At the same time, the hopper F will be opened so that there will flow that material that corresponds to the weight measurement between perforations 1b and 2b. Naturally, when perforation 2b moves opposite light sensitive element 2c, the hopper feeding the second material will be closed and the hopper controlling the third material to be fed will be opened. There will thus be a complete automatic feeding of the batch once the feeding is initiated. Because the particular material feeding means actuated and controlled by the light sensitive elements are not part of the invention herein set forth, and may be of many different types and for varying materials including fluids, I am not describing the said means in this application except in the general way set forth.

I believe that the very simple and effective nature of my invention will now be apparent to those skilled in the art.

I now claim:

1. In a scale of the class described, a dial, means mounting said dial for rotation about a predetermined axis in response to the weight applied to the scale, a series of hopper controlling circuits, a light responsive element in each of said circuits, illuminating means for said light responsive elements at one side of said dial, and means mounting said light responsive elements in positions differently spaced from the dial axis at the side of said dial opposed to said illuminating means whereby a particular zone of said dial controls each circuit individually through its light responsive element in all rotated positions of the dial, said dial having openings in at least certain of the said zones through which the illuminating means actuates the corresponding hopper controlling circuits while the dial rotates on its axis.

2. In a scale of the class described, a dial, means mounting said dial for rotation about a predetermined axis in response to the weight applied to the scale, a series of hopper controlling circuits, a light responsive element in each of said circuits, illuminating means for said light responsive elements at one side of said dial, and means mounting said light responsive elements in positions differently spaced from the dial axis at the side of said dial opposed to said illuminating means whereby a particular zone of said dial controls each circuit individually through its light responsive element in all rotated positions of the dial, said dial having openings in at least certain of the said zones for allowing said illuminating means to actuate the corresponding light responsive elements, and said openings being spaced from one another angularly with respect to the rotation of said dial whereby to actuate the hopper controlling circuits sequentially while the dial rotates on its axis.

3. In a combination of the class described, a scale having a dial, means rotating said dial about a predetermined axis in response to the weight applied to the scale, a series of hoppers, an electric control circuit for each of said hoppers, a light responsive element in each of said circuits, illuminating means for said light responsive elements at one side of said dial, and means mounting said light responsive elements in positions differently spaced from the dial axis at the side of said dial opposed to said illuminating means whereby a particular zone of said dial controls each hopper through its circuit in all rotated positions of the dial, said dial having openings in at least certain of the said zones through which the illuminating means coacts with the light sensitive elements to actuate corresponding hoppers while weight is added to the scale.

4. In a combination of the class described, a scale, a dial in said scale, means rotating said dial about a predetermined axis in response to the weight applied to the scale, a series of hoppers, an electric control circuit for each of said hoppers, a light responsive element in each of said circuits, illuminating means for said light responsive elements at one side of said dial, and means mounting said light responsive elements in positions differently spaced from the dial axis at the side of said dial opposed to said illuminating means whereby a particular zone of said dial controls individually each hopper circuit in all rotated positions of the dial, said dial having openings in at least certain of the said zones for the passage of light from said illuminating means to said light sensitive elements whereby to actuate the corresponding hopper control circuits as said dial rotates the openings into alignment with the light responsive elements, and said openings being spaced from one another angularly with respect to the rotation of said dial whereby said hoppers are actuated sequentially through said control circuits while weight is added to the scale.

OSWALD S. CARLISS.

References Cited in the file of this patent

UNITED STATES PATENTS

| Number | Name | Date |
|---|---|---|
| 420,884 | Mercadier | Feb. 4, 1890 |
| 1,931,852 | Reichel | Oct. 24, 1933 |
| 1,954,955 | Siebers | Apr. 17, 1934 |
| 2,007,306 | Peuker | July 9, 1935 |
| 2,038,746 | Madsen | Apr. 28, 1936 |
| 2,046,005 | Sprecker | June 30, 1936 |
| 2,065,960 | Bauml | Dec. 29, 1936 |
| 2,091,768 | Noble | Aug. 31, 1937 |
| 2,169,465 | Hadley | Aug. 15, 1939 |
| 2,184,156 | Bowles | Dec. 19, 1939 |
| 2,197,514 | Barnes | Apr. 16, 1940 |
| 2,336,130 | Saxe | Dec. 7, 1943 |
| 2,337,535 | Acs | Dec. 28, 1943 |
| 2,376,234 | De Castro | May 15, 1945 |
| 2,625,300 | Saxe | Jan. 13, 1953 |